United States Patent

Noji

[11] Patent Number: 5,119,193
[45] Date of Patent: Jun. 2, 1992

[54] VIDEO-SIGNAL PROCESSING DEVICE
[75] Inventor: Shozo Noji, Tokyo, Japan
[73] Assignee: NEC Corporation, Tokyo, Japan
[21] Appl. No.: 760,958
[22] Filed: Sep. 17, 1991
[30] Foreign Application Priority Data
  Sep. 19, 1990 [JP] Japan .................. 2-249748
[51] Int. Cl.[5] .............................................. H04N 5/14
[52] U.S. Cl. .................. 358/166; 364/724.10
[58] Field of Search .......... 358/140, 167, 166, 37; 364/724.10

[56] References Cited
U.S. PATENT DOCUMENTS

| | | | |
|---|---|---|---|
| 4,933,766 | 6/1990 | de Haan | 358/166 |
| 4,947,251 | 8/1990 | Hentschel | 358/166 |
| 5,014,129 | 5/1991 | Imanishi | 358/166 |
| 5,016,103 | 5/1991 | Rabii | 358/166 |
| 5,049,998 | 9/1991 | Lee | 358/166 |

Primary Examiner—Howard W. Britton
Attorney, Agent, or Firm—Helfgott & Karas

[57] ABSTRACT

A video signal processing device includes a first interpolation filter, a second interpolation filter, a frequency component detection circuit and a switching circuit. The first interpolated signal free from deterioration in a horizontal direction and the second interpolated signal permitting smooth interpolation in an oblique direction are selected in accordance with the horizontal frequency component of a picture pattern. Therefore, in the in-field interpolation processing for double-speed conversion, the horizontal resolution is not deteriorated for the image having a fine picture pattern and also smooth interpolation can be made for the image having an oblique component.

5 Claims, 6 Drawing Sheets

VIDEO-SIGNAL PROCESSING DEVICE

BACKGROUND OF THE INVENTION

The present invention relates to a video signal processing device for a television receiver or the like, which processes scanning lines by converting them into a doubled speed form in an in-field processing.

The conventional video signal processing device in which scanning lines are converted into a doubled speed by an in-field processing comprises, as shown in FIG. 1, a delay circuit 300 for receiving a video signal Si to produce a delayed real line signal Sa, and an interpolation filter 400 for receiving the video signal Si to produce an interpolated signal Sb.

The interpolation filter 400 serves to produce the interpolated signal Sb on the basis of each of video signals in a vertical, a horizontal and an oblique direction, and is composed of a plurality of line memories, coefficient multipliers, adders, etc.

An example of such conventional interpolation filter 400 is shown in FIG. 2. Its operation is as follows. The video signal Si is delayed by line memories 402~404 by one line each successively, and each of the video signal and the delayed video signals is multiplied by each of the coefficient multipliers 405, 406, 407, and 408. The video signals with the coefficients having been applied by the coefficient multipliers 405, 406, 407 and 408 are added by an adder 409, whereby an interpolated signal Sv is produced on the basis of the video signal in the vertical direction. The interpolated signal Sv thus obtained is delayed by a plurality of D-type flip-flops 410, 411, 412 and 413 in the horizontal direction. successively, and each of the signal Sv and the resultant delayed signals is multiplied by each of corresponding coefficient multipliers 414, 415, 416, 417 and 418. The interpolated signals having been subjected to multiplication by the respective coefficient multipliers 414~418 are added by an adder 419, thereby producing the interpolated signal Sb. If the real line signal Sa obtained by delaying the video signal Si by the delay circuit 300 and the interpolated signal Sb are alternately outputted for each scanning line, an output of the doubled-speed converted scanning lines can be obtained.

However, the conventional video signal processing device has the following defect. When the scanning lines are converted into a double speed form in the in-field processing, the interpolated signal is produced by one interpolation filter. For this reason, if such an interpolation filter that produces an interpolated signal having a slanting and smooth edge is used for the processing of a fine picture pattern, the image is distorted or broken up at a high frequency region resulting in a blurred image, thus deteriorating the horizontal resolution thereof.

SUMMARY OF THE INVENTION

The present invention has been completed in view of the above problem, and an object of the present invention is to provide a video signal processing device which can provide an image with a fine picture pattern free from deterioration of the horizontal resolution, and also can perform a smooth interpolation processing for the image with an oblique component.

In order to attain the above object, in accordance with the present invention, there is provided a video signal processing device which comprises:

a first interpolation filter for interpolating a video signal in a vertical direction to produce a first interpolated signal;

a second interpolation filter for interpolating the video signal in each of a vertical. a horizontal and an oblique direction to produce a second interpolated signal;

a frequency component detection circuit for detecting the horizontal frequency component; and a switching circuit for selecting either of the first interpolated signal and the second interpolated signal to be outputted as an interpolated signal on the basis of the detection result in the fequency component detection circuit.

In the present invention, the first interpolated signal obtained by the first interpolation filter, which is free from deterioration as to the horizontal resolution, is suitable for processing a fine picture pattern, whereas the second interpolated signal obtained by the second interpolated signal is suited to perform smooth interpolation for the image having an oblique component.

In accordance with the present invention, by detecting the horizontal frequency component by the frequency component detection circuit, and by switching the switch circuit according to the detection result, the first interpolated signal is selected for the image having a horizontal high frequency component whereas the second interpolated signal is selected for the image with no horizontal high frequency component, so that an optimum interpolated signal with no deterioration of the resolution in the horizontal direction and with smooth interpolation in the oblique direction correspondingly to the picture pattern can be outputted by an in-field processing.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Figure 1:
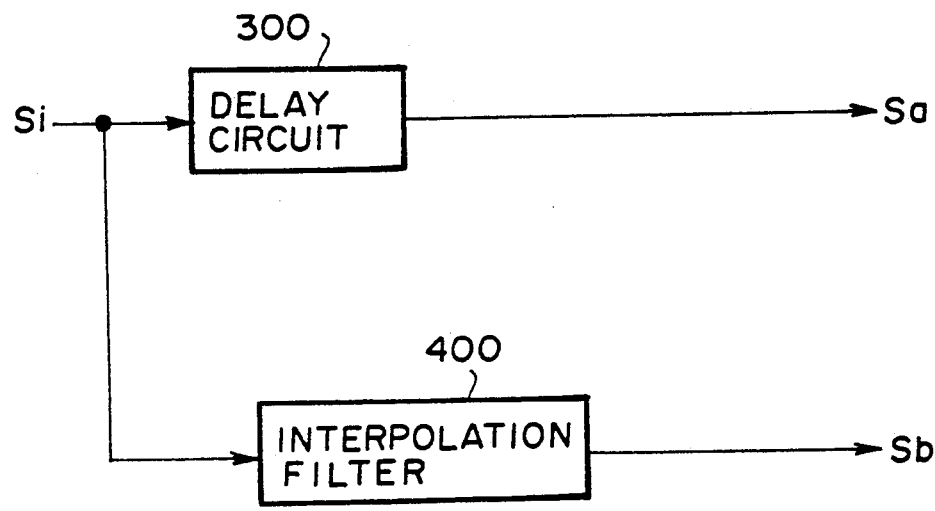
FIG.1 is a block diagram of the conventional video signal processing device.
Figure 2:
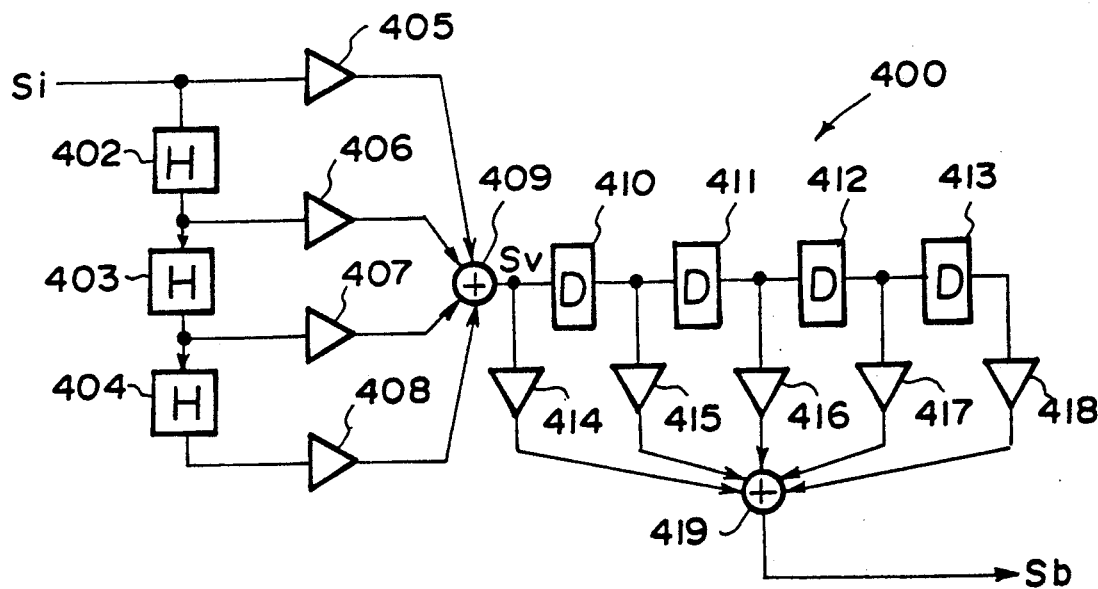
FIG. 2 is a detailed block diagram of the interpolation filter in the device of FIG. 1.

Now, referring to the drawings, an explanation will be given of embodiments of the present invention.

It should be noted that, throughout the following explanation, similar reference symbols or numwerals refer to the same or similar elements in all the figures of the drawings.

Figure 3:
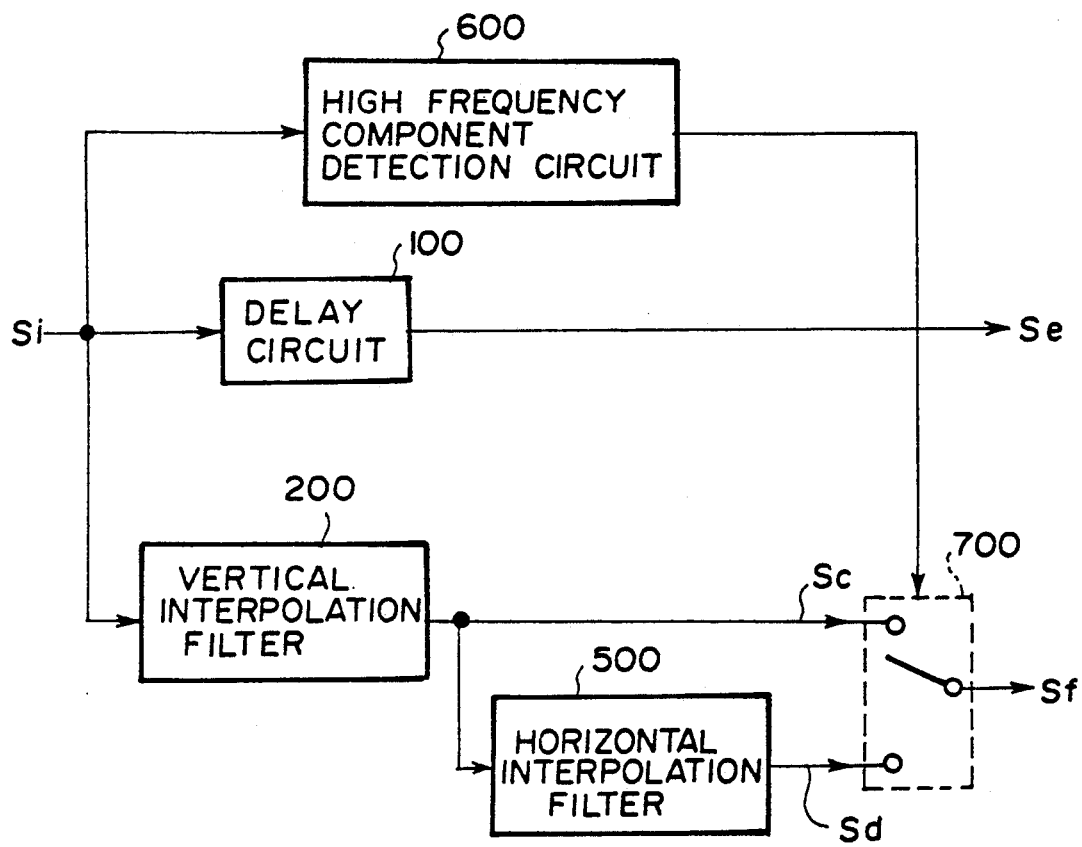
FIG. 3 is a block diagraam of the video signal processing device according to the first embodiment of the present invention.

FIG. 3 is a block diagram of the video signal processing device according to one embodiment of the present invention.

Figure 4:
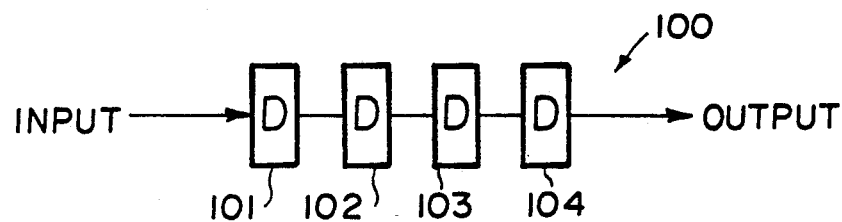
FIG. 4 is a detailed block diagram of the delay circuit shown in FIG. 3.

A video signal Si is inputted to a delay circuit 100 so as to be converted into a real line signal Se. The delay circuit 100 is composed of four D-type flip-flops 101~104 as shown in FIG. 4. Each of the D-type flip-flops 101~104 produces a delay of 69 ns at a clock of $4f_{sc}$ (14.3 MHz), and so the four D-type flip-flops 101~104 make a delaying of a total of 276 ns. The reason for using the number of four D-type flip-flops 101~104 in this embodiment is to make coincident the time base of the real line signal Se and that of an interpolated signal Sf.

Figure 5:
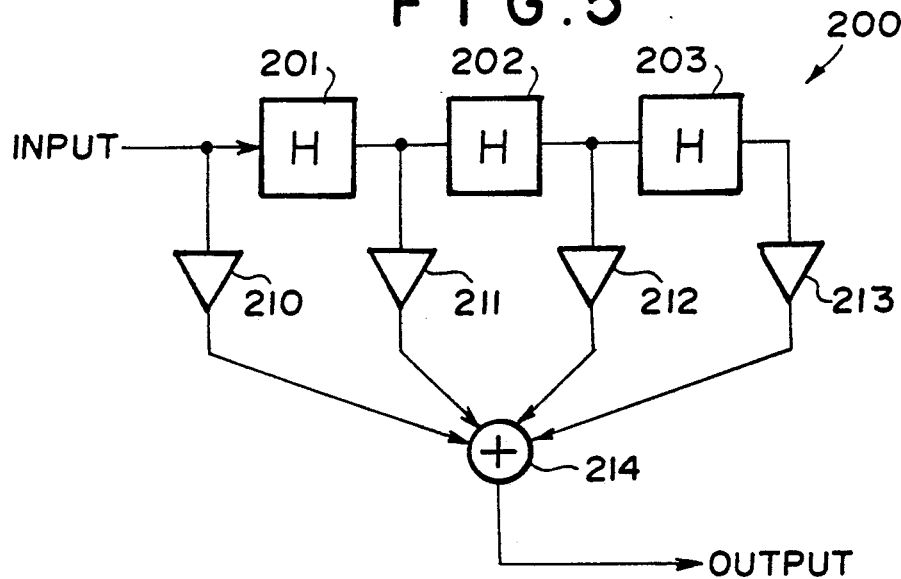
FIG. 5 is a detailed block diagram of the vertical interpolation filter shown in FIG. 3.

Further, the video signal Si is inputted to a vertical interpolation filter 200. This filter 200 produces a video signal Sc which is a first interpolated signal produced from the video signal component in the vertical direction. As shown in FIG. 5, the vertical interpolation filter 200 is composed of three line memories 201~203, four coefficient multipliers 210~213 and one adder 214. Each of the line memory 201~203 makes a delay (63.56 μ) corresponding to one line of the video signal. For example, if the coefficients of the coefficient multipliers 210~213 are set for ⅛, ⅜, ⅜ and ⅛, respectively, the video signal Sc in FIG. 3 can be produced. The video signal Sc is inputted to one input terminal of the switching circuit 700.

Figure 6:
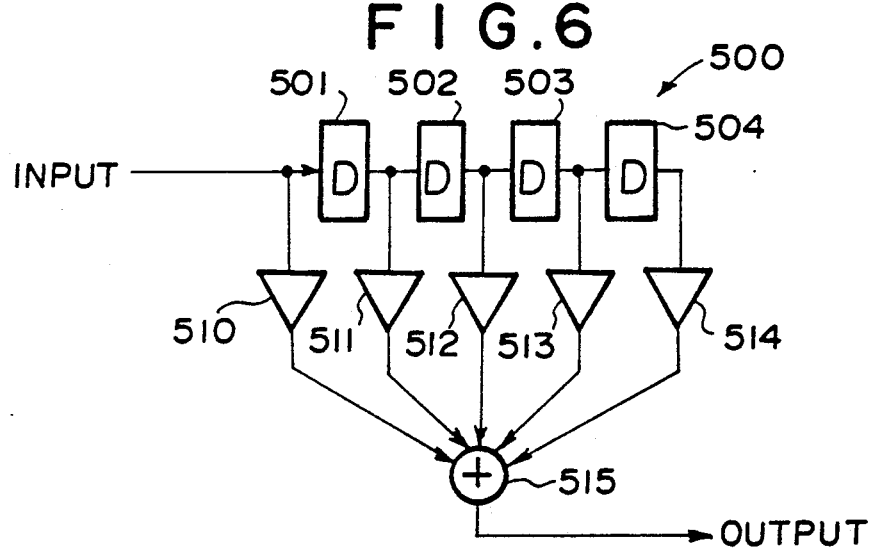
FIG. 6 is a detailed block diagram of the horizontal interpolation filter shown in FIG. 3.

The video signal Sc is also inputted to a horizontal interpolation filter 500. This filter 500 produces a video signal Sd which is a second interpolated signal produced based on the video signals in the horizontal, oblique and vertical directions. As shown in FIG. 6, the horizontal interpolated filter 500 is composed of four D-type flip-flops 501~504, five coefficient multipliers 510~514 and one adder 515. This horizontal interpolation filter 500 together with the vertical interpolation filter 200 described above constitutes the second interpolation filter which produces the interpolated signal Sd.

Figure 7:
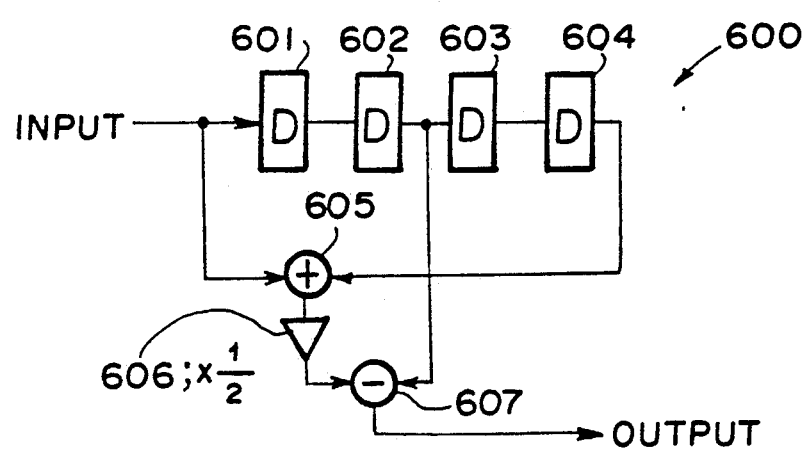
FIG. 7 is a detailed diagram of the high frequency detection circuit shown in FIG.3.
Figure 8:
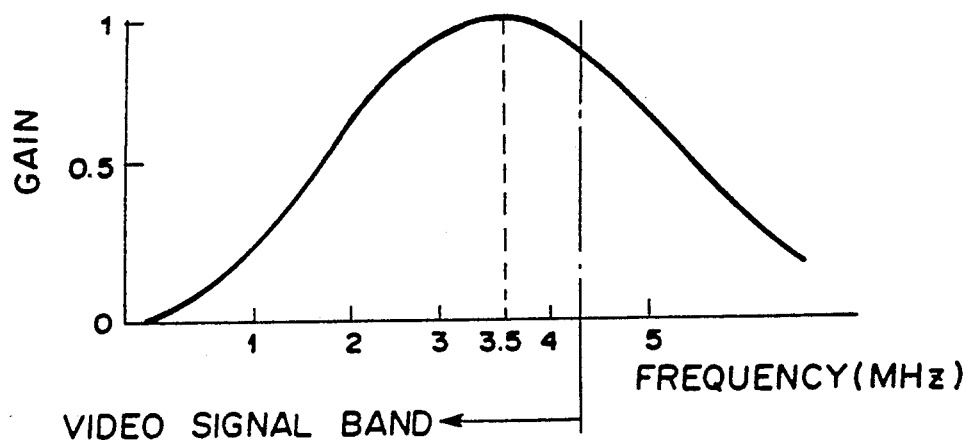
FIG. 8 is a graph showing the frequency characteristic of the high frequency detection circuit shown in FIG. 7.

The video signal Si is also supplied to a high frequency component detection circuit 600. As shown in FIG. 7, this high frequency component detection circuit 600 is composed of four D-type flip-flops 601~604, one adder 605, one coefficient multiplier 606 and one subtracter 607. Each of the D-type flip-flops 601~604 makes a delay of 69 ns at the clock of $4f_{sc}$ (14.3 MHz). The high frequency component detection circuit 600 serves as a high-pass filter for the video signal having the frequency up to 4.2 MHz because of the frequency characteristic as shown in FIG. 8. The high frequency component detection circuit 600 detects whether or not the video signal Si has the high frequency component and controls the switching circuit 700 on the basis of the detection result. Specifically, if the video signal Si has the high frequency component, the switching circuit 700 selects the video signal Sc, so that the interpolated signal Sf(=SC) produced based on the video signal in the vertical direction is outputted. On the other hand, if the video signal Si does not have the high frequency component, the switching circuit 700 selects the video signal Sd, so that the interpolated signal Sf(=Sd) produced based on the video signals in the horizontal, vertical and oblique directions is outputted.

The real line signal Se and the interpolated signal Sf are alternately outputted for each scanning line, so that the doubled speed video signal of the scanning lines is produced by the real line signal Se and the interpolated signal Sf.

Figure 9:
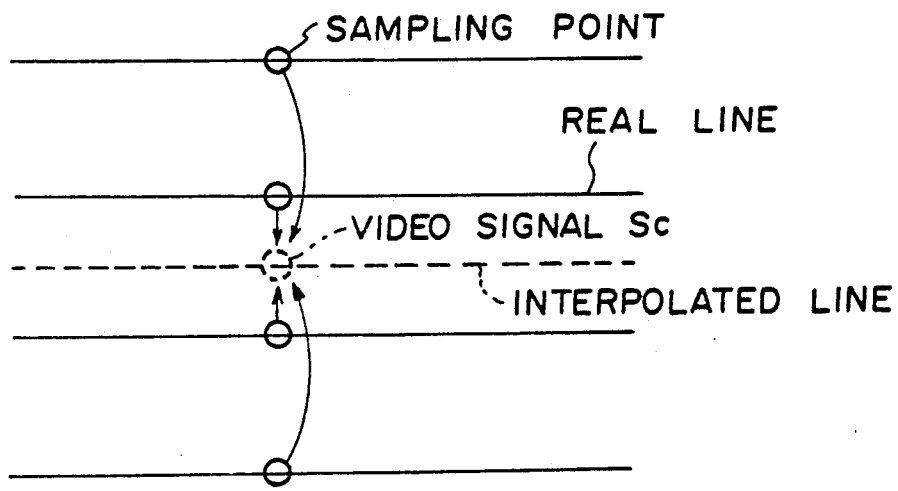
FIG. 9 is a schematic view for explaining the way of producing a first interpolated signal.

FIG. 9 is a schematic view for explaining the way of producing the video signal Sc of FIG. 3 on the basis of the images at sampling points on a screen. The video signal Sc which is an interpolated signal is produced based on the sampling points in the vertical direction only. In this case, the video signal Sc includes no horizontal component, so that the horizontal frequency component of the interpolated signal will not be deteriorated. For this reason, the resultant picture pattern is not blurred, so that the interpolated signal Sc is suitably used for a fine picture pattern.

Figure 10:
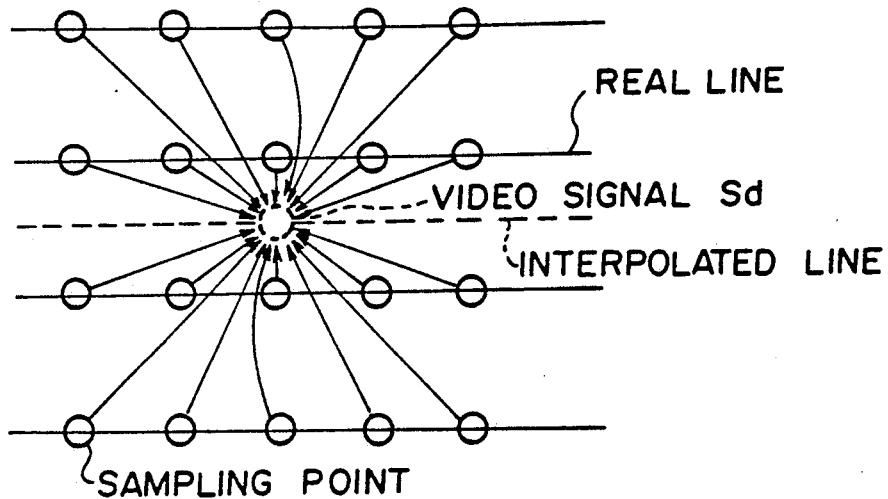
FIG. 10 is a schematic view for explaining the way of producing a second interpolated signal.

FIG. 10 is a schematic view for explaining the way of producing the video signal Sd of FIG. 3 on the basis of the images at sampling points on a screen. The video signal Sd which is an interpolated signal is produced based on the sampling points in the vertical, horizontal and oblique directions. In this case, the video signal Sd has the component in the oblique direction, so that a smooth image with on notches or indentations relative to an oblique line can be obtained.

Figure 11A:
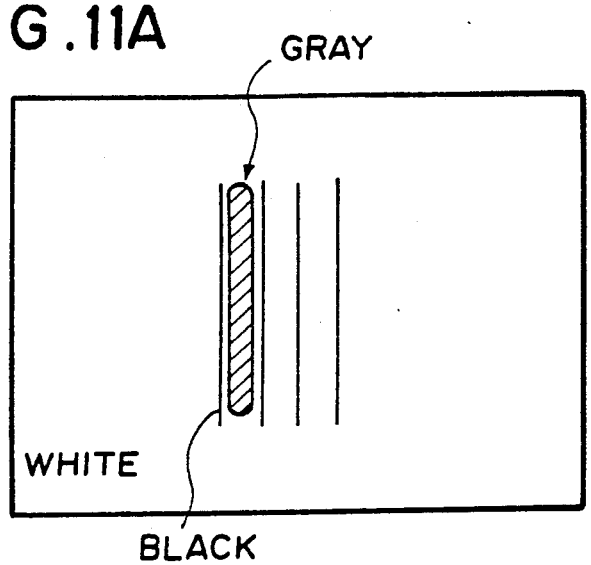
FIGS. 11A and 11B are schematic views for explaining the effect of the present invention in comparisons to that of the prior art.
Figure 11B:
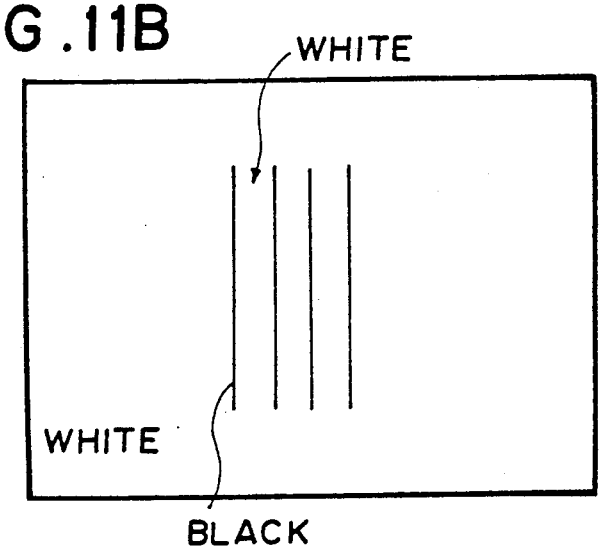

FIGS. 11A and 11B are for explaining the effect of the video signal processing device according to this embodiment in comparison to the prior art device. With respect to a high frequency range with a number of black and white vertical lines arranged with short gaps therebetween, the prior art presents a gray image between the vertical lines, thereby deteriorating the horizontal resolution as shown in FIG. 11A, whereas the present invention provides a clear image without deterioration of the horizontal resolution in the high frequency range as seen in FIG. 11B.

Figure 12:
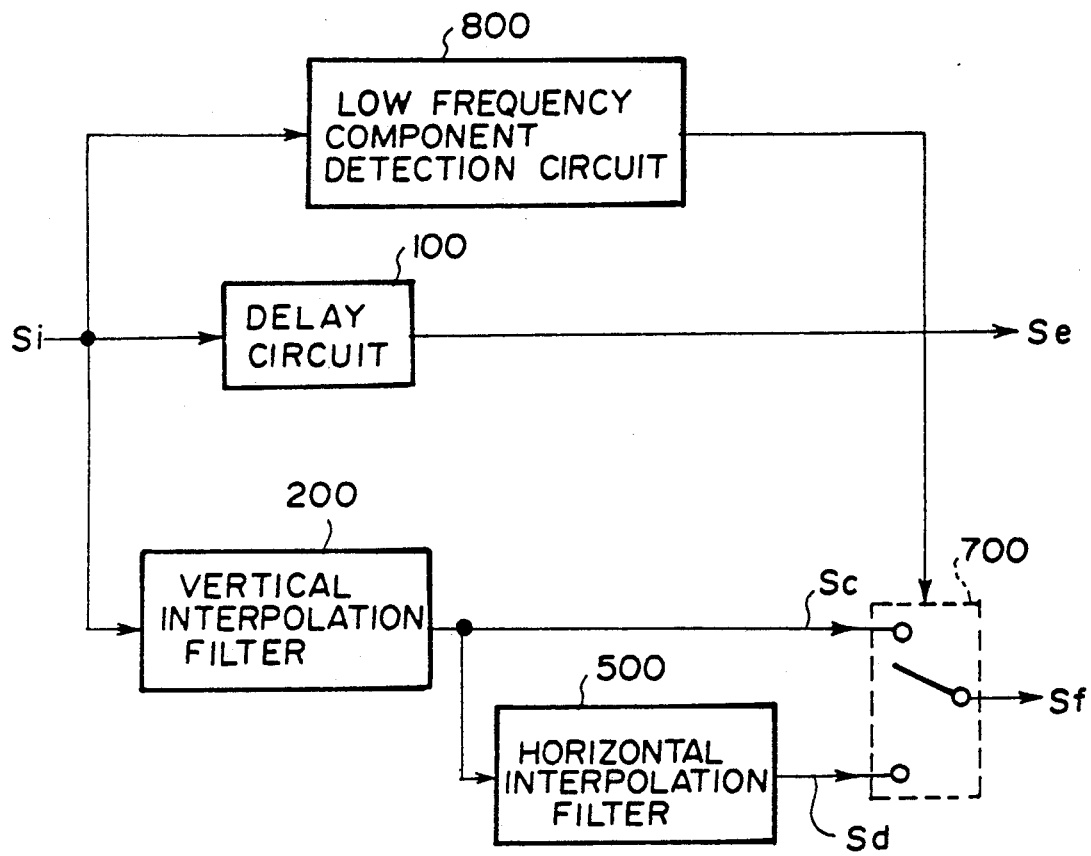
FIG. 12 is a block diagram of the video signal processing device according to the second embodiment of the present invention.

FIG. 12 is a block diagram of the video signal processing device according to the second embodiment of the present invention. In FIG. 12, like reference symbols refer to like parts in FIG. 3, and these parts will not be explained here again.

Figure 14:
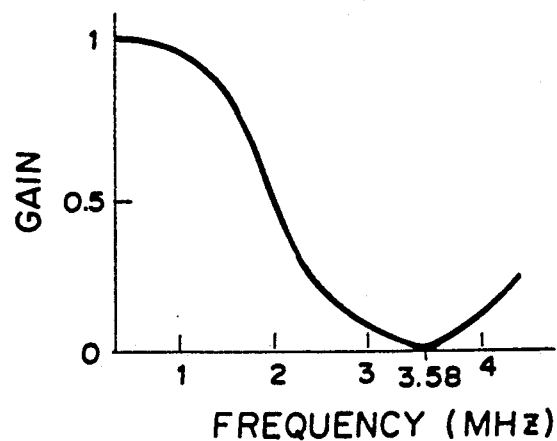
FIG. 14 is a graph showing the characteristic of the low frequency component detection circuit shown in FIG. 13.
Figure 13:
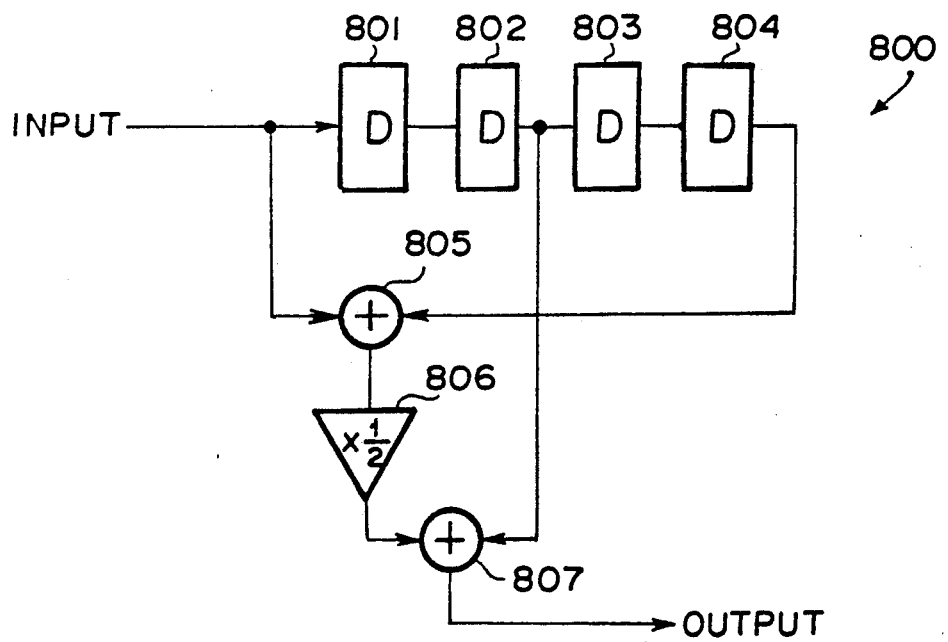
FIG. 13 is a block diagram of the low frequency component detection circuit shown in FIG. 12.

This embodiment is different from the previous embodiment in the point that a low frequency component dictation circuit 800 is used in place of the high frequency component detection circuit 600. As shown in FIG. 13, the low frequency component detection circuit 800 is composed of four D-type flip-flops 801~804 and two adders 805, 807 and one coefficient multiplier 806. Each of the D-type flip-flops 801~804 makes a delay of 69 ns at the frequency of $4f_{sc}$ (14.3 MHz). The low frequency component detection circuit 800 serves as a low-pass filter having a frequency characteristic as shown in FIG. 14. The low frequency component detection circuit 800 detects whether or not the video signal Si has the low frequency component and controls the switching circuit 700 on the basis of the detection result. Specifically, if the video signal Si has the low frequency component, the switching circuit 700 selects the video signal Sd. On the other hand, if the video signal Si has no low frequency component, the switching circuit 700 selects the video signal Sc.

In this second embodiment also, the optimum interpolated signal suited to any picture patterns can be obtained in the in-field processing on the basis of the horizontal frequency component of the video signal Si.

As described above, in accordance with the present invention, the first interpolated signal free from deterioration in the horizontal direction and the second interpolated signal permitting smooth interpolation in the oblique direction are appropriately selected or changed in accordance with the horizontal frequency component of a picture pattern. Therefore, in the in-field interpolation processing for double-speed conversion, the present invention can have the advantage that the horizontal resolution is not deteriorated for the image having a fine picture pattern and also smooth interpolation can be made for the image having an oblique component.

In the prior art, specifically as for a moving image, the image quality has been greatly deteriorated owing to the interpolation processing. In contrast, in accordance with the present invention, the horizontal resolution can be enchanced more than twice as high as the prior art, and also unnatural notches can be removed as for the image including a moving oblique component.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A video signal processing device comprising:
   a first interpolation filter for interpolating a video signal in a vertical direction to produce a first interpolated signal;
   a second interpolation filter for interpolating the video signal in each of a vertical, a horizontal and an oblique direction to produce a second interpolated signal;
   a frequency component detection circuit for detecting the horizontal frequency component; and
   a switching circuit for selecting either of said first interpolated signal and said second interpolated signal to be outputted as an interpolated signal on the basis of the detection result in the frequency component detection circuit.

2. A video signal processing device according to claim 1, wherein said frequency component detection circuit is a circuit for detecting a high frequency component.

3. A video signal processing device according to claim 1, wherein said frequency component detection circuit is a circuit for detecting a low frequency component.

4. A video signal processing device according to claim 1, further comprising a delay circuit for delaying said video signal to produce a real line signal.

5. A video signal processing device according to claim 4, wherein said real line signal and the first or second interpolated signal are alternately outputted for each scanning line.

* * * * *